(12) United States Patent
Adolfsson et al.

(10) Patent No.: US 8,646,803 B2
(45) Date of Patent: Feb. 11, 2014

(54) BABY CARRIAGE WITH STAND TO PREVENT TIPPING

(75) Inventors: Johan Adolfsson, Sohna (SE); David Thalén, Bromma (SE)

(73) Assignee: Elite Group Sverige AB, Jonkoping (SE)

( * ) Notice: Subject to any disclaimer, the term of this patent is extended or adjusted under 35 U.S.C. 154(b) by 439 days.

(21) Appl. No.: 13/057,172

(22) PCT Filed: Jun. 23, 2009

(86) PCT No.: PCT/SE2009/050794
§ 371 (c)(1),
(2), (4) Date: Feb. 2, 2011

(87) PCT Pub. No.: WO2010/016790
PCT Pub. Date: Feb. 11, 2010

(65) Prior Publication Data
US 2011/0193326 A1 Aug. 11, 2011

(30) Foreign Application Priority Data

Aug. 4, 2008 (SE) ...................................... 0801754

(51) Int. Cl.
*B62B 7/06* (2006.01)
(52) U.S. Cl.
USPC ........................................................ 280/647
(58) Field of Classification Search
CPC .......... B62B 9/005; B62B 7/044; B62B 5/049
USPC ............ 280/650, 642, 293, 6.15, 6.155, 7.17,
280/33.994, 35, 643, 648, 657, 658, 43,
280/43.1, 43.14, 43.24, 47.131, 47.18,
280/47.33, 763.1, 641, 644, 647, 30, 301,
280/304, 298, 352, 295

See application file for complete search history.

(56) References Cited

U.S. PATENT DOCUMENTS

| | | | | | |
|---|---|---|---|---|---|
| 2,353,326 | A | * | 7/1944 | Troendle | 280/755 |
| 2,456,250 | A | * | 12/1948 | Boudreau | 280/763.1 |
| 2,480,431 | A | * | 8/1949 | Welsh | 188/20 |
| 3,090,634 | A | * | 5/1963 | Rubin et al. | 280/31 |
| 3,217,839 | A | * | 11/1965 | Watkins et al. | 188/4 R |
| 3,279,754 | A | * | 10/1966 | Rizzuto | 254/418 |
| 3,918,743 | A | * | 11/1975 | Sato et al. | 280/293 |
| 3,980,320 | A | * | 9/1976 | Marchello | 280/293 |
| 4,294,464 | A | * | 10/1981 | Ettridge | 280/649 |
| 4,844,209 | A | * | 7/1989 | Sedlack | 188/5 |
| 5,158,319 | A | * | 10/1992 | Norcia et al. | 280/643 |
| 5,388,848 | A | * | 2/1995 | Silva et al. | 280/300 |
| 5,462,300 | A | * | 10/1995 | Chien | 280/87.051 |

(Continued)

FOREIGN PATENT DOCUMENTS

| | | |
|---|---|---|
| EP | 1 878 635 | 1/2008 |
| WO | 2006/028519 | 3/2006 |
| WO | 2007/056778 | 5/2007 |

*Primary Examiner* — John R Olszewski
*Assistant Examiner* — Brodie Follman
(74) *Attorney, Agent, or Firm* — Drinker Biddle & Reath LLP

(57) ABSTRACT

The present description relates to a baby carriage comprising two rear wheels and a front wheel, a chassis that is carried by said wheels, a seat carried in the chassis and intended for a passenger, as well as a folding stand. The stand guarantees that the baby carriage does not risk tipping and that it stands stably on the substratum when it stands still.

14 Claims, 9 Drawing Sheets

(56) References Cited

U.S. PATENT DOCUMENTS

| | | | |
|---|---|---|---|
| 5,511,802 A * | 4/1996 | Aitken | 280/1.5 |
| 6,026,524 A * | 2/2000 | Barger | 5/93.1 |
| D491,492 S * | 6/2004 | Lu | D12/110 |
| 6,767,028 B2 * | 7/2004 | Britton et al. | 280/644 |
| 6,769,708 B2 * | 8/2004 | Ackerly | 280/295 |
| 6,834,869 B1 * | 12/2004 | Adams | 280/33.994 |
| 7,014,203 B2 * | 3/2006 | Liu | 280/293 |
| 7,303,204 B2 * | 12/2007 | Takahashi | 280/302 |
| 7,398,988 B2 * | 7/2008 | Ostrow et al. | 280/642 |
| 7,681,902 B2 * | 3/2010 | Suzuki et al. | 280/303 |
| 2002/0093164 A1 * | 7/2002 | Tai | 280/87.041 |
| 2006/0043689 A1 * | 3/2006 | Ostrow et al. | 280/62 |
| 2007/0235979 A1 * | 10/2007 | Lin | 280/293 |
| 2008/0100030 A1 * | 5/2008 | Brakhage et al. | 280/293 |

* cited by examiner

BABY CARRIAGE WITH STAND TO PREVENT TIPPING

RELATED APPLICATION DATA

This application is a §371 National Stage Application of PCT International Application No. PCT/SE2009/050794 filed Jun. 23, 2009, and also claims priority under 35 U.S.C. §119 and/or §365 to Swedish Application No. 0801754-3, filed Aug. 4, 2008.

FIELD OF THE INVENTION

The present invention refers to a baby carriage or perambulator comprising two rear wheels as well as at least one front wheel, a chassis carried on said wheels and a device carried in the chassis and intended for a passenger. More specifically, the invention refers to a baby carriage that comprises a stand to prevent the baby carriage from tipping when it is not moving.

BACKGROUND

There are a number of different types of baby carriages of varying construction. Baby carriages have a chassis construction that is carried by a plurality of wheels that are in contact with the substratum. In the chassis, there is arranged a device intended to hold a passenger, for instance a seat or a baby carriage body.

It is today usual with baby carriages having three wheels, so-called three-wheelers. Those are also sometimes called baby joggers as they originally were developed for exercising parents. Said type of carriage is used to an increasing extent as they often are neat and easily handled. The baby carriage has two rear wheels as well as one front wheel that often is pivotable 360° around a vertical axis. The pivotable front wheel, sometimes also called swivel wheel, makes, among other things, that the baby carriage is easy to steer.

FIG. 1 shows a perspective view of a baby carriage 1 according to prior art comprising a chassis 4 with a handle 5 to be able to push and steer the baby carriage 1. The baby carriage 1 has two rear wheels 2 as well as one front wheel 3. The wheels 2, 3 are arranged in a triangular configuration and connected to the chassis 4. Commonly, the front wheel 3 has a castor suspension so as to make it pivotable 360° around the vertical axis thereof and in such a way facilitate the steering of the baby carriage 1. The chassis 4 is furthermore intended to hold a device (not shown) for a passenger.

Recently, it has also become common with baby carriages that resemble the three-wheelers but having four wheels where the front wheels are placed relatively close to each other, i.e., the spacing between the two front wheels is considerably smaller than the spacing between the two rear wheels.

There is also a variant that usually is called city stroller. Commonly, these have two front wheels, which often may have a smaller diameter than the rear wheels. Just as for three-wheelers, the wheels are not fixed but are possible to turn, which makes the carriage easier to manoeuvre.

There is often a risk that a baby carriage tips when it is not moving, for instance as a consequence of a passenger getting up into or out of the baby carriage or if the passenger hangs over the side of the baby carriage. This is a problem since the passenger risks getting hurt if the baby carriage tips. This risk is particularly great for three-wheelers, because the same are not as stable as baby carriages having four wheels since the centre of gravity of the baby carriage ends up relatively high and far in the rear, which means that the baby carriage may tip over easier. Furthermore, there is an increased risk that baby carriages having wheels that are castor suspended tip, since said wheels may have different direction when the baby carriage is not moving, which in turn makes the baby carriage unstable.

WO 2006/028519 discloses a baby carriage having three wheels. The baby carriage has a stand that is movable between a retracted location and a deployed location. When the stand is deployed, it has two legs that extend downward on each side of the front wheel of the baby carriage and accordingly constitute supports to prevent the baby carriage from tipping over. The two legs of the stand are arranged in such a way that they do not reach all the way down to the ground when the stand is lowered so as to allow the legs to be moved between the raised and lowered position without interfering with irregularities in the ground. Accordingly, this makes that the carriage can tip somewhat laterally, which in turn means that it, in spite of the stand, is not entirely stable when it is not moving.

SUMMARY

The object of the present invention is to make that a baby carriage stands steadily and is prevented from tipping when it is not moving.

The object is attained by a baby carriage in accordance with the independent claim 1. Preferred embodiments are defined by the dependent claims.

The baby carriage according to the invention comprises two rear wheels and at least one front wheel, a chassis carried by said wheels, a device, such as a seat or a baby carriage body, carried in the chassis and intended to hold a passenger, as well as a folding stand. The stand is intended to be raised when the baby carriage is moved and lowered when the baby carriage should stand still.

The stand has a first elongate leg and a second elongate leg arranged in such a way that they have the extension thereof on each side of the front wheel when the stand is in the lowered position, a first horizontal cross-bar that is connected in one end thereof to said first leg and in the other end thereof to said second leg, means for attachment of the stand in the chassis which means have a horizontal rotation axis and are arranged in one end of said first elongate leg and said first horizontal cross-bar being arranged at a distance from said horizontal rotation axis.

The stand has a stable construction as a consequence of the design thereof and guarantees in this way that the baby carriage stands steadily on the substratum when it is not moving and the stand is lowered in the supporting position thereof. When the stand is in the lowered position, said first horizontal cross-bar is intended to abut against the front wheel and in such a way brake the same.

According to a preferred embodiment of the invention, said first horizontal cross-bar has a curved section that, among other things, guarantees that the front wheel is directed in the direction of travel of the baby carriage.

It is also preferred that the stand is arranged in such a way that it, when the same is in the lowered supporting position, keeps the front wheel a bit above the substratum to thereby guarantee that the baby carriage is in contact with the substratum in four spots, two consisting of the rear wheels and two consisting of the two elongate legs of the stand.

The invention is particularly formed for baby carriages that have three wheels, since it is these carriages that primarily run a risk of tipping when they are not moving. The invention may however also be used for other types of baby carriages having more wheels, and is also particularly advantageous for baby carriages having four wheels where the front wheels have a shorter mutual spacing than the mutual spacing of the rear wheels. The invention is also particularly suitable for baby carriages that have at least one front wheel having castor suspension.

BRIEF DESCRIPTION OF THE DRAWINGS

FIG. 10c shows a perspective view of the stand in FIG. 10a.

FIG. 11b shows a perspective view of a part of the baby carriage according to the invention comprising an actuator according to FIG. 11a.

DETAILED DESCRIPTION

Figure 1:
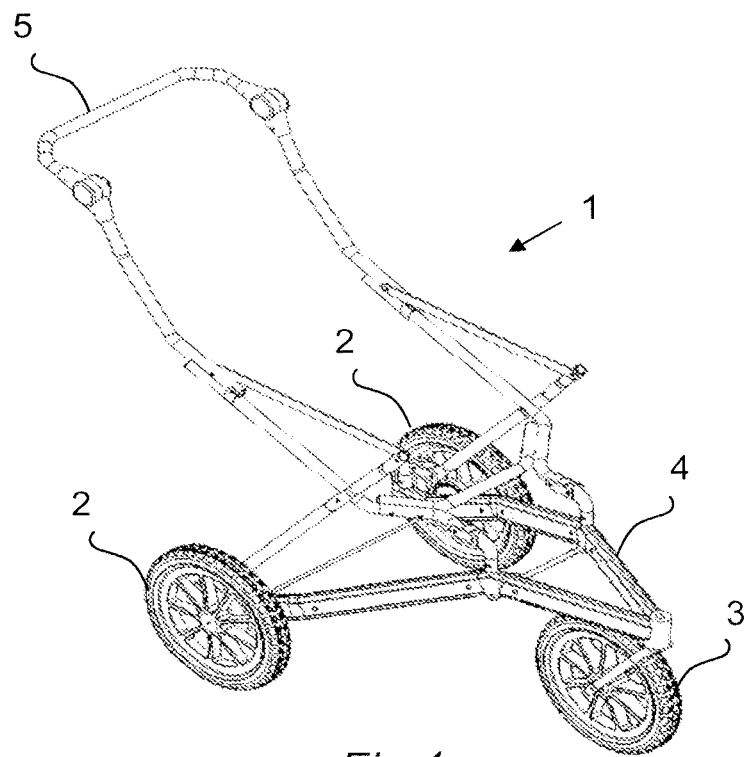
FIG. 1 shows a perspective view of a baby carriage in accordance with prior art.

Below, the invention will be described, reference being made to the figures. The invention is not limited to the embodiments described below and shown in the drawings but may be modified within the scope of the claims, for instance, the chassis may be of another construction than the one shown in the figures.

FIG. 1 shows a perspective view of a baby carriage 1 according to prior art comprising a chassis 4 with a handle 5 to be able to push and steer the baby carriage 1. The baby carriage 1 has two rear wheels 2 as well as one front wheel 3, the wheels 2, 3 being arranged in a triangular configuration and connected to the chassis 4 in accordance with prior art. Commonly, the front wheel 3 has a castor suspension to thereby be able to facilitate the steering of the baby carriage 1 and is often called a swivel wheel. The chassis 4 is furthermore intended to hold a device (not shown) for a passenger, such as a seat or a baby carriage body.

In accordance with the present invention, the baby carriage 1 is provided with a folding stand. The stand has a first elongate leg, a second elongate leg, a first horizontal cross-bar as well as means for attachment of the stand on the inside of the chassis 4. The attachment means have a horizontal rotation axis and are arranged in the upper end of said elongate legs. The attachment means may preferably consist of a rotating rod, but may also be in the form of two trunnions. The stand is arranged in such a way that it rotates around the rotation axis of the attachment means to be raised and lowered. The attachment is suitably effected by introducing the means into holes in the chassis 4, alternatively holes in a part fitted to the chassis 4, which holes suitably are placed on the inside of the chassis at a distance from the connection of the front wheel 3 to the chassis 4.

Figure 2:
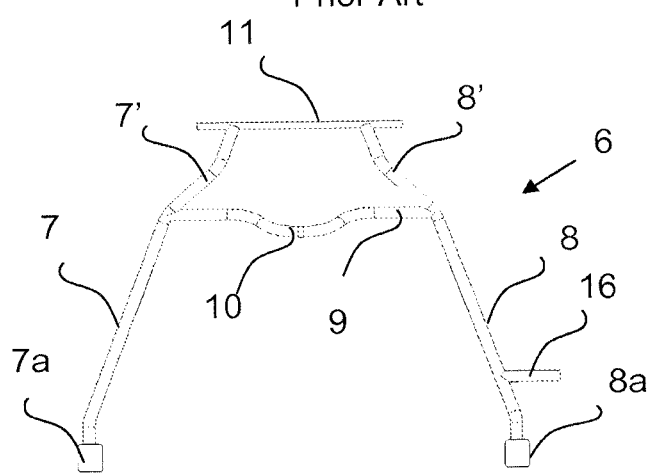
FIG. 2 shows a planar view of the stand according to a first embodiment of the invention as seen in the direction of travel of the baby carriage.

FIG. 2 shows a planar view as seen in the direction of travel of the baby carriage of a first embodiment of the stand 6 according to the invention. The stand 6 comprises a first elongate leg 7 as well as a second elongate leg 8, which legs 7, 8 are intended to be placed on each side of the front wheel 3 when the stand 6 is in the lowered supporting position. The stand 6 comprises furthermore a first horizontal cross-bar 9 that has an extension between the elongate legs 7, 8 and that is connected in one end thereof to said first elongate leg 7 and in the other end thereof to said second elongate leg 8. The cross-bar 9 serves the purpose of, on one hand, stabilizing the construction of the stand 6, and on the other hand acting as a stop against the front wheel 3 when the stand 6 is being lowered. When the stand is in the lowered supporting position, the cross-bar 9 will abut against the front wheel 3.

The cross-bar 9 has a curved section 10 that is essentially U-shaped and intended to steer the wheel in such a way that it is turned straight forward when the baby carriage is not moving and the stand 6 is lowered. Furthermore, in the upper edge thereof, the stand 6 comprises a horizontal rotating rod 11 having a rotation axis that coincides with the extension of the rotating rod. In the respective ends thereof, the rotating rod 11 is intended for attachment of the stand 6 to the inside of the chassis 4. The elongate legs may in the respective ends thereof intended to be in contact with the substratum when the stand is lowered optionally be provided with covers 7a, 8a, suitably of rubber. The stand 6 may also optionally be provided with a foot piece 16 projecting from one of the elongate legs and having the purpose of allowing the driver of the baby carriage to lower the stand by putting a foot against said foot piece 16 and thereby treading down the stand until the stand is in contact with the substratum.

Said first horizontal cross-bar 9 is arranged at a distance from the upper ends of said elongate legs in such a way that it is arranged at a distance from the rotation axis of the attachment means (which in FIG. 2 is a rotating rod).

In the respective upper part 7', 8' thereof, said first and second elongate legs 7, 8 are preferably somewhat inwardly curved toward a vertical centre axis of the baby carriage 1 to thereby facilitate attachment of the stand to the chassis 4.

Figure 3A:
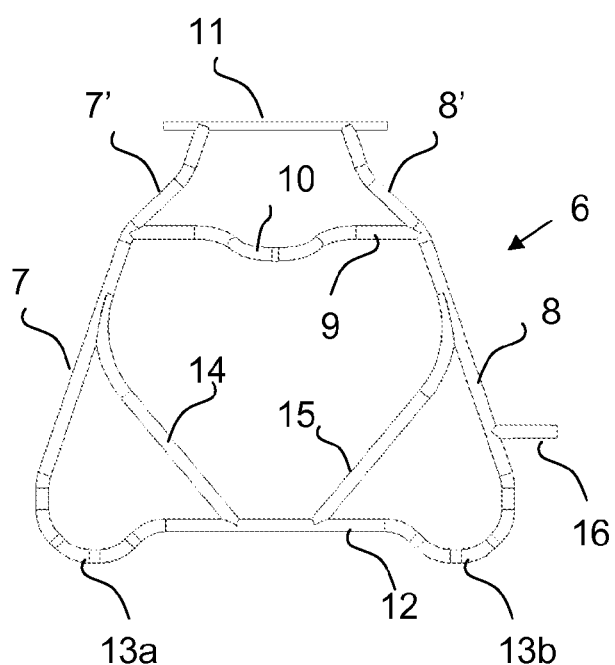
FIG. 3a shows a planar view of the stand according to a second embodiment of the invention as seen in the direction of travel of the baby carriage.
Figure 3C:
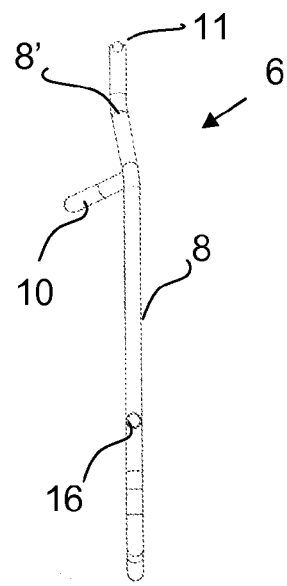
FIG. 3c shows a side view of the stand according to a second embodiment of the invention.
Figure 3B:
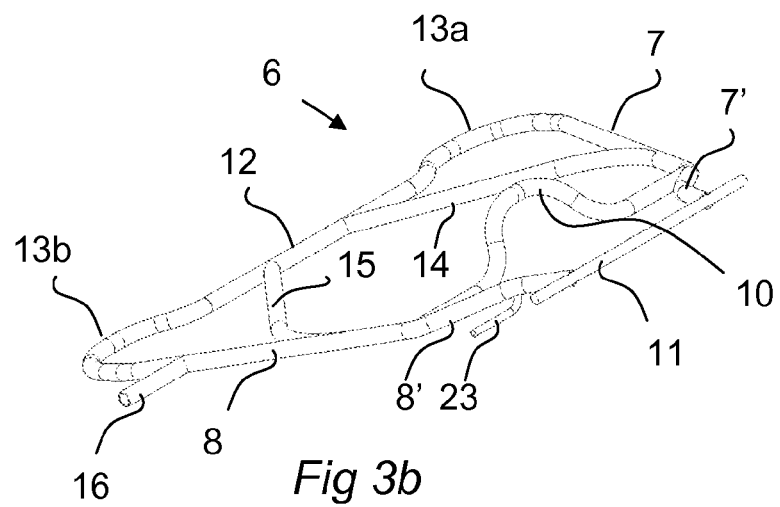
FIG. 3b shows a perspective view of the stand according to a second embodiment of the invention.

FIGS. 3a-3c show the stand 6 according to a second embodiment of the invention. The stand 6 comprises a first elongate leg 7 as well as a second elongate leg 8, which legs 7, 8 are intended to be placed on each side of the front wheel 3 when the stand 6 is in the lowered supporting position. The stand 6 comprises furthermore a first horizontal cross-bar 9 that has an extension between the elongate legs 7, 8 and that is connected in one end thereof to said first elongate leg 7 and in the other end thereof to said second elongate leg. The cross-bar 9 serves the purpose of, on one hand, stabilizing the construction of the stand 6, and on the other hand acting as a stop against the front wheel 3 when the stand 6 is being lowered. The cross-bar 9 has a curved section 10 that is essentially U-shaped and intended to steer the wheel in such a way that it is turned straight forward when the baby carriage is not moving and the stand 6 is lowered. When the stand is in the lowered position, the cross-bar 9 will abut against the front wheel 3 in the curved section 10.

Furthermore, in the upper edge thereof, the stand 6 comprises a horizontal rotating rod 11 having a rotation axis that coincides with the extension of the rotating rod. In the respective ends thereof, the rotating rod is intended for attachment of the stand 6 to the chassis 4. In the respective upper part 7', 8' thereof, said first and second elongate legs 7, 8 are preferably somewhat inwardly curved toward a vertical centre axis of the baby carriage 1 to thereby facilitate attachment of the stand to the chassis 4.

Furthermore, the stand according to the second embodiment comprises a second horizontal cross-bar 12 that is placed under the first cross-bar 9 as seen when the stand is in the lowered position, i.e., said second cross-bar is connected to the elongate legs 7, 8 in their respective ends that are opposite to the ends to which the attachment means are arranged. In one end thereof, said second cross-bar 12 is connected via a curved section 13a to said first elongate leg 7 and in the other end thereof connected via a curved section 13b to said second elongate leg 8. Said bends 13a, 13b are intended to be in contact with the substratum on which the baby carriage rests when the stand is in the lowered position, the baby carriage 1 being supported in the front edge thereof by means of the stand 6 on said bends 13a, 13b.

Optionally, the stand has also a first stabilizing leg 14 that in one end thereof is connected to said second horizontal cross-bar 12 and in the other end thereof is connected to said first elongate leg 7, as well as a second stabilizing leg 15 that in one end thereof is connected to said second horizontal cross-bar 12 and in the other end thereof to said second elongate leg 8. The stabilizing legs 14, 15 serve the purpose of, on one hand, stabilizing the construction of the stand 6, and on the other hand steering the position of the front wheel 3 in such a way that it is angled straight forward when the stand 6 is lowered. Optionally, the stand 6 may also have a projecting foot piece 16 that has the purpose of allowing the driver of the baby carriage to lower the stand by treading with a foot against said foot piece 16.

Figure 4A:
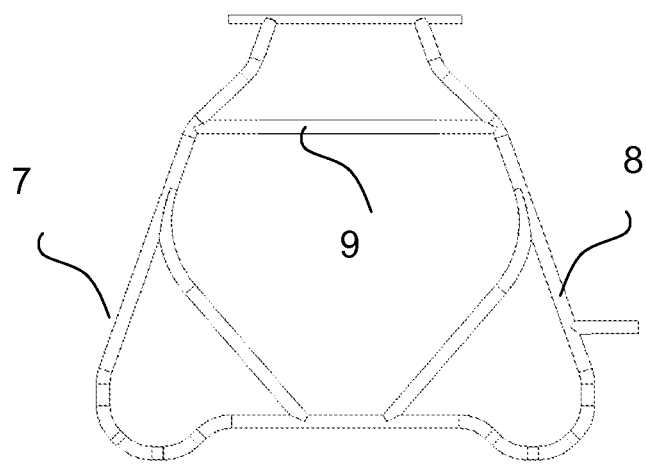
FIG. 4a shows a planar view of the stand according to an alternative embodiment.

FIG. 4a shows a planar view of an alternative embodiment of the stand 6 where said first horizontal cross-bar 9 is straight and accordingly does not have any bend. In the same way as has been described in the above embodiments, the cross-bar 9 serves the purpose of, on one hand, stabilizing the construction of the stand 6, and on the other hand acting as a stop against the front wheel 3 when the stand 6 is being lowered.

Figure 4B:
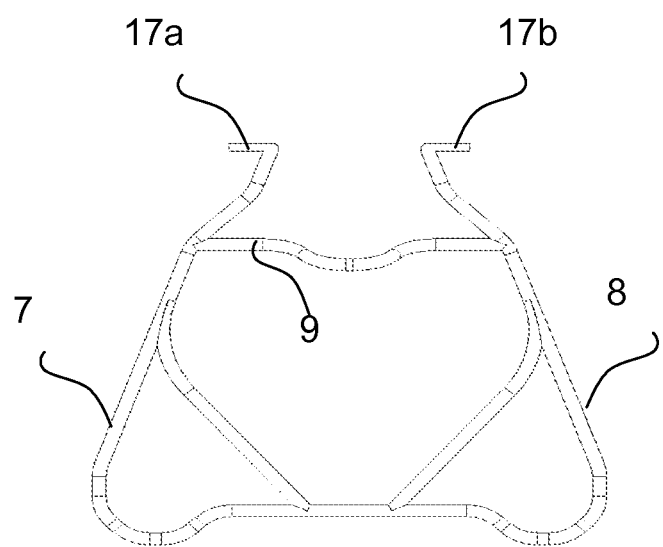
FIG. 4b shows a planar view of the stand according to an additional alternative embodiment as seen in the direction of travel of the baby carriage.

FIG. 4b shows a planar view as seen in the direction of travel of the baby carriage of another alternative embodiment of the stand 6 that differs from the stand 6 in FIG. 3a by the fact that it does not have any rotating rod. Instead the stand comprises a first horizontal trunnion 17a in the upper part of the first elongate leg 7 as well as a second horizontal trunnion 17b in the upper part of the second elongate leg 8. The trunnions 17a, 17b have a common rotation axis and are intended for attachment of the stand to the chassis 4.

The function of the stand will now be described further, reference being made to FIGS. 5a-7b. In these figures, the stand has been depicted in accordance with the embodiment shown in FIGS. 3a-3c. However, it should be appreciated that the stand also may have the other designs that have been described above.

Figure 5A:
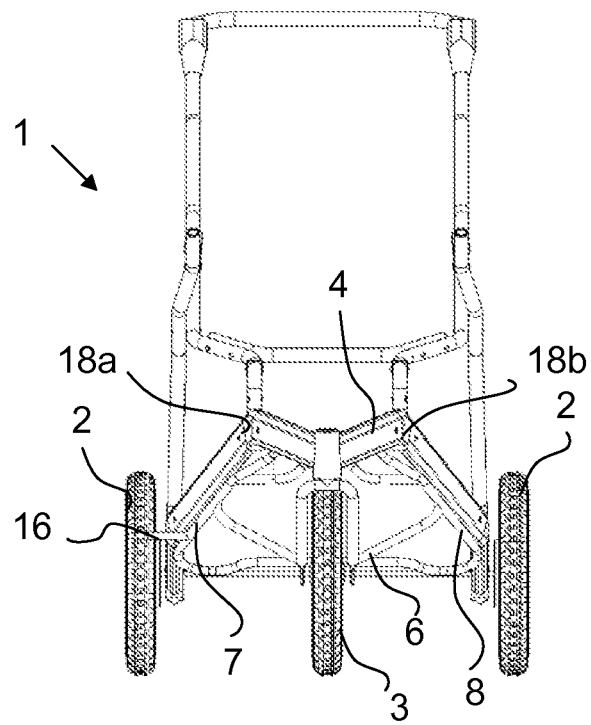
FIG. 5a shows a front view of a baby carriage having a stand according to the invention where the stand is in the raised position.
Figure 5B:
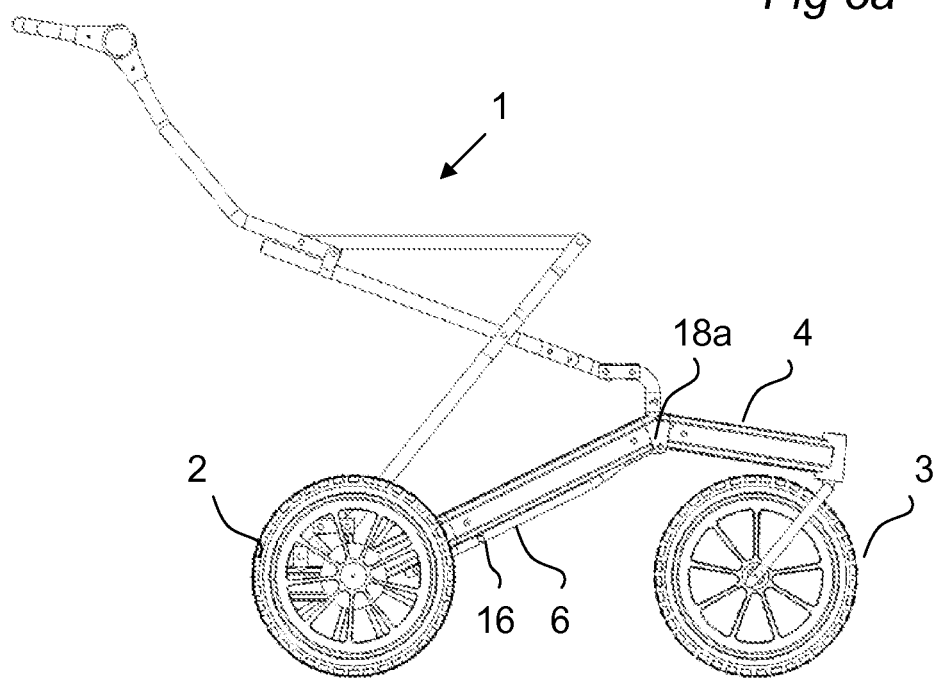
FIG. 5b shows a side view of a baby carriage having a stand according to the invention where the stand is in the raised position.

FIG. 5a shows a front view of a baby carriage 1 in accordance with the present invention. The baby carriage 1 has two rear wheels 2 as well as one front wheel 3. The front wheel may have a castor suspension to be pivotable 360° and in such a way facilitate the steering of the baby carriage. The wheels 2, 3 are placed in a triangular configuration and are connected to a chassis 4 in accordance with prior art. The baby carriage 1 has also a stand 6 that has a first elongate leg 7 as well as a second elongate leg 8 and is attached to the inside of the chassis 4 in two spots by means of attachment means, on the inside of the chassis 4 in point 18a and 18b, respectively. In FIG. 5a, the stand is raised, the elongate legs 7, 8 abutting or being in the vicinity of the underside of the chassis 4. FIG. 5b is a side view of the baby carriage 1 according to FIG. 5a.

According to one embodiment, the stand 6 is clamped in the raised position thereof by means of locking means (not shown), such as for instance clamping means to the underside of the chassis 4. Such locking means are suitably fitted to the underside of the chassis 4. This guarantees that the stand stays absolutely still when it is in the raised position thereof. It is also feasible that the stand is clamped in the raised position thereof by means of a spring (not shown).

The stand is lowered by allowing it to rotate downward around the rotation axis of the rotating rod 11 (or another attachment device). When the stand is to be lowered from the raised position thereof, this may for instance be carried out by the driver of the baby carriage placing a foot on the projecting foot piece 16 of the stand and pressing the stand with the foot against the substratum on which the baby carriage rests. The stand will then be positioned in a partly lowered position. It is also feasible that the stand is allowed to be lowered by means of its own weight.

Figure 6A:
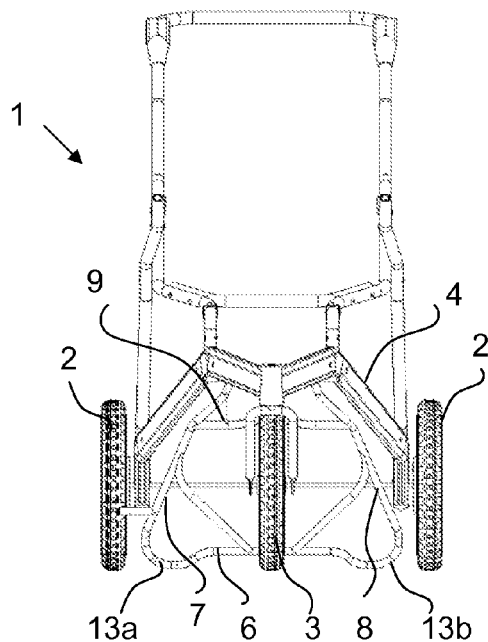
FIG. 6a shows a front view of a baby carriage having a stand according to the invention where the stand is in a partly lowered position.
Figure 6C:
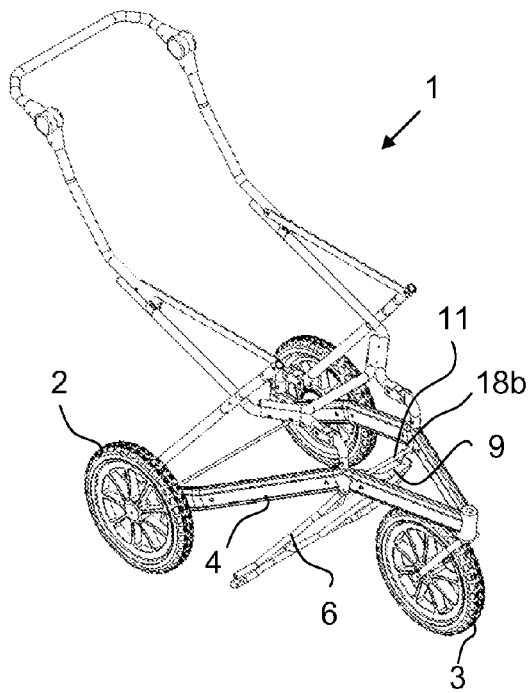
FIG. 6c shows a perspective view of a baby carriage having a stand according to the invention where the stand is in a partly lowered position.
Figure 6B:
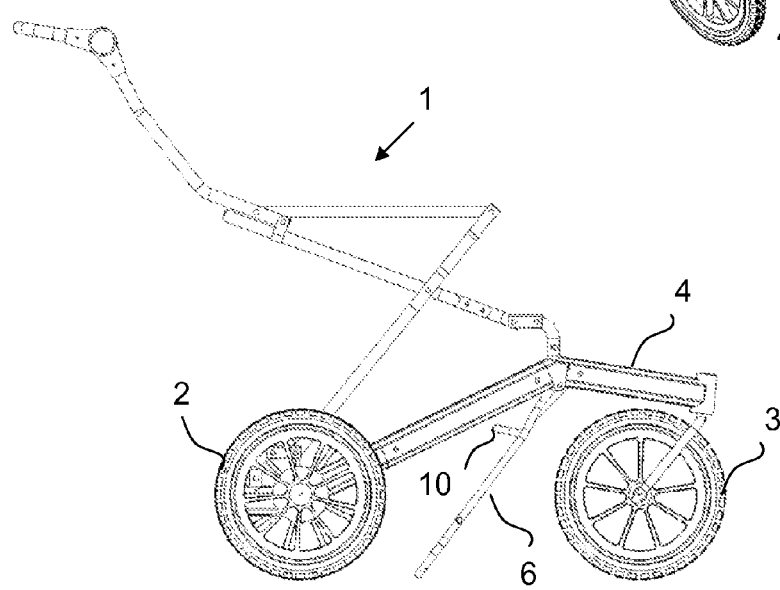
FIG. 6b shows a side view of a baby carriage having a stand according to the invention where the stand is in a partly lowered position.

FIG. 6a shows a front view of the baby carriage 1 according to FIG. 5a but where the stand is partly lowered. The stand 6 has, as has been described above, a first elongate leg 7 as well as a second elongate leg 8 and a first horizontal cross-bar 9 arranged between said legs 7, 8. FIG. 6b shows a side view and FIG. 6c a perspective view of the baby carriage 1 according to FIG. 6a. In FIG. 6b, it is also seen that the cross-bar 9 has a curved section 10 that is bent from the front wheel 3. When the stand is in the partly lowered position, as is shown in FIGS. 6a-6c, the stand 6 reaches the ground in the curved sections 13a and 13b, respectively. In FIG. 6c, there is also seen the rotating rod 11 around which the stand 6 rotates to be raised and lowered from the respective positions thereof and which rotating rod 11 has an attachment to the chassis 4 in the respective ends thereof, one attachment 18b thereof being seen in the figure.

In order to get the stand in the lowered supporting position thereof, the baby carriage is pulled rearward, i.e., toward the driver of the baby carriage, from the position shown in FIGS. 6a-6c in such a way that the two elongate legs 7, 8 of the stand 6 have the respective extension thereof on each side of the front wheel 3. When the baby carriage 1 is pulled rearward, the curved section 10 of the first horizontal cross-bar 9 will guarantee that the front wheel 3 is directed straight forward in the direction of travel of the baby carriage. The stabilizing legs 14, 15 will also assist in guaranteeing that the front wheel 3 turns straight forward. The direction of the front wheel 3 is important above all for three-wheelers since they become more stable in case the front wheel 3 is directed forward in the direction of travel when the baby carriage 1 is not moving.

Figure 7A:
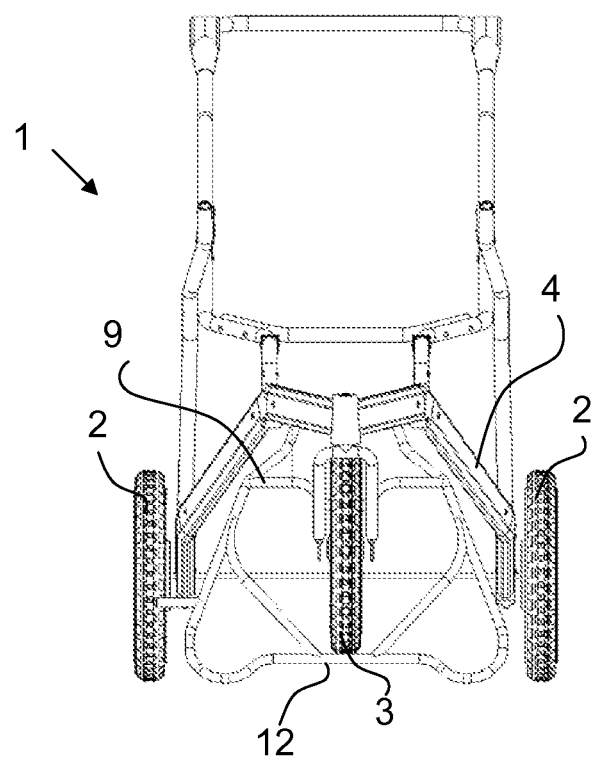
FIG. 7a shows a front view of a baby carriage having a stand according to the invention where the stand is in the lowered supporting position.
Figure 7B:
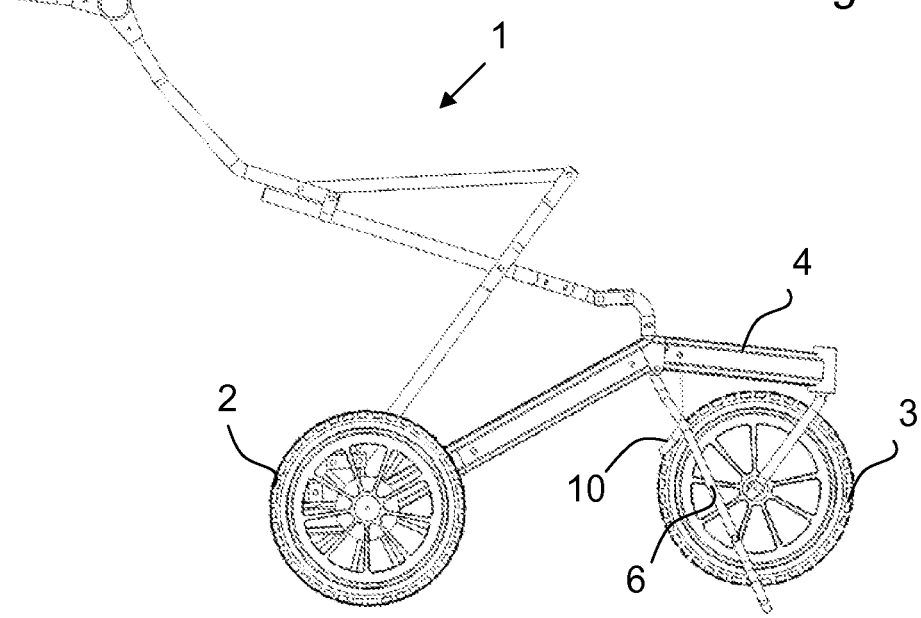
FIG. 7b shows a side view of a baby carriage having a stand according to the invention where the stand is in the lowered supporting position.

In FIGS. 7a and 7b, there are shown a front view and a side view, respectively, of the baby carriage 1 when the stand 6 is in the lowered operative position, i.e., lowered supporting position. When the stand is in this position, said first horizontal cross-bar 9 will abut against the front wheel 3 and the stand 3 will accordingly not be foldable any further out. Thereby, the cross-bar 9 stops the rotation of the stand 6. Furthermore, the front wheel 3 will be braked by the cross-bar 9. In case said first horizontal cross-bar 9 has a curved section 10, the same will contribute further in maintaining the direction of the front wheel 3.

According to a preferred embodiment, the length of the first and second elongate leg 7, 8, respectively, of the stand is greater than the diameter of the front wheel 3. Thereby, the stand 6 will make that the front wheel 3 has no contact with the substratum on which the baby carriage 1 rests, but the front part of the baby carriage 1 is only supported by the stand 6 when the same is in the lowered supporting position. Said second horizontal cross-bar 12 will accordingly be arranged under the front wheel 3 when the stand is in the lowered position. The stand may, for instance, be constructed in such a way that the front wheel 3 hovers some centimeters above the substratum on which the baby carriage rests when the stand is in the folded-out supporting position thereof.

When the baby carriage 1 then is to be moved and the stand 6 accordingly should be brought back to the raised position, the driver just pushes the baby carriage 1a bit forward in such a way that the stand 6 is brought back under the front wheel 3 to the partly lowered position thereof, which has been illustrated in FIGS. 6a-6c, whereupon the front wheel 3 of the baby carriage contacts the substratum and the baby carriage 1 accordingly rests on all of the wheels 2, 3 thereof. Next, the stand 6 can easily be raised to the raised position thereof, which has been illustrated in FIGS. 5a and 5b. The stand may be fixed and kept in the raised position thereof, for instance by means of locking means, as has been described above.

Figure 8A:
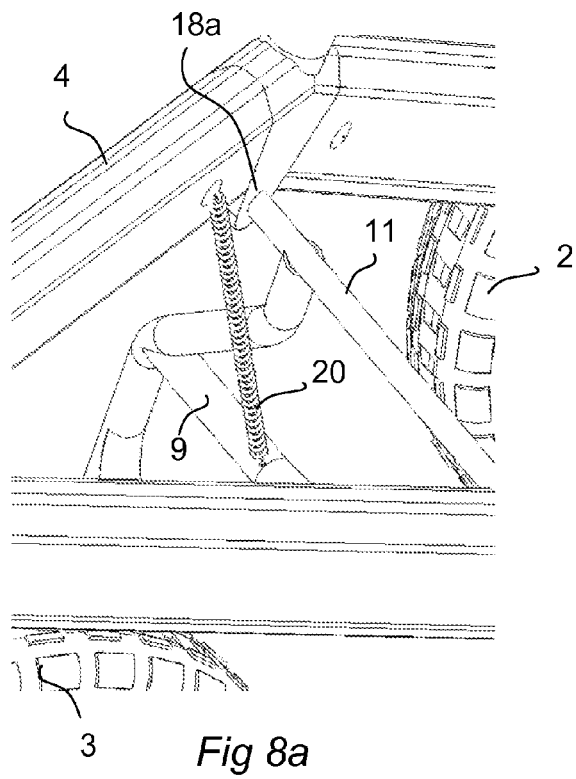
FIG. 8a shows a perspective view of a part of the baby carriage according to an embodiment, the stand being connected with the chassis by means of a spring.

According to one embodiment of the invention, the stand 6 may be connected with the chassis 4 by means of a spring in order to assist in raising and/or lowering of the stand. According to one embodiment, the spring 20 may be connected in one end thereof to the inside of the chassis 4 and in the other end thereof to said first horizontal cross-bar 9, as is illustrated in FIG. 8a. In FIG. 8a, there are seen a part of the front wheel 3, a part of one rear wheel 2, the rotating rod 11 of the stand, and the stand is in a partly lowered position. When the stand is in the raised position, the spring 20 according to this embodiment is extended and extends under the rotating rod 11. When the stand is loosened from the raised position thereof, the spring 20 will assist in lowering the stand until it reaches the substratum on which the baby carriage rests. In FIG. 8a, there is also seen how the rotating rod 11 in one end thereof is fixed on the inside of the chassis 4 in the point 18a.

Figure 8B:
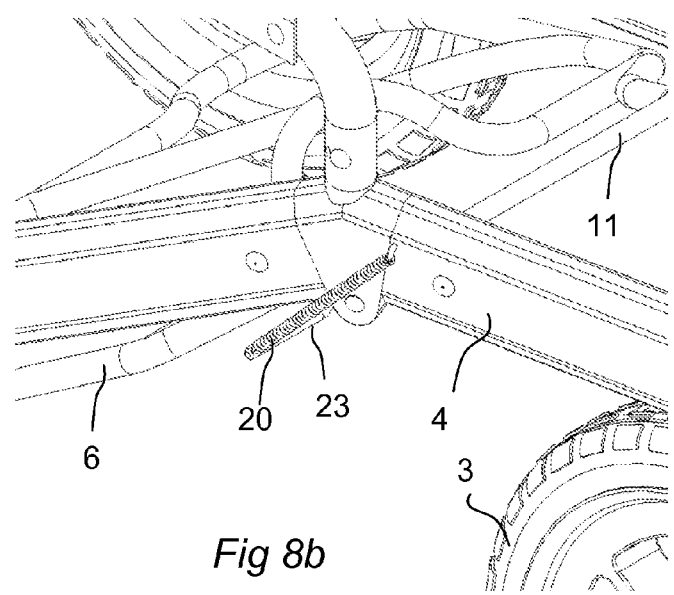
FIG. 8b shows a perspective view of a part of the baby carriage according to an alternative embodiment, the stand being connected with the chassis by means of a spring.

In FIG. 8b, an alternative embodiment is shown, the spring 20 being attached in the upper part thereof to the outside of the chassis 4 as well as in the other part thereof to a projecting part 23 from the stand. The placement of the projecting part 23 on the stand is shown clearly in FIG. 3b, it being connected to the inwardly curved part 8' of said second elongate leg 8. Of course, the spring and the projecting part may also be placed on the opposite side of the baby carriage, the projecting part being connected to said first elongate leg 7. The placement of the upper holder of the spring controls where the stand turns by the fact that this defines where the state of equilibrium of the spring is. The stand is pulled up toward the chassis 4 by the spring 20 until it is brought past the state of equilibrium when the spring instead pulls the stand forward/downward. The advantage of the placement of the spring according to FIG. 8b is that the spring 20 has a free way to move and that it can be shorter and stiffer than in the case of the placement of the spring in FIG. 8a.

Figure 9:
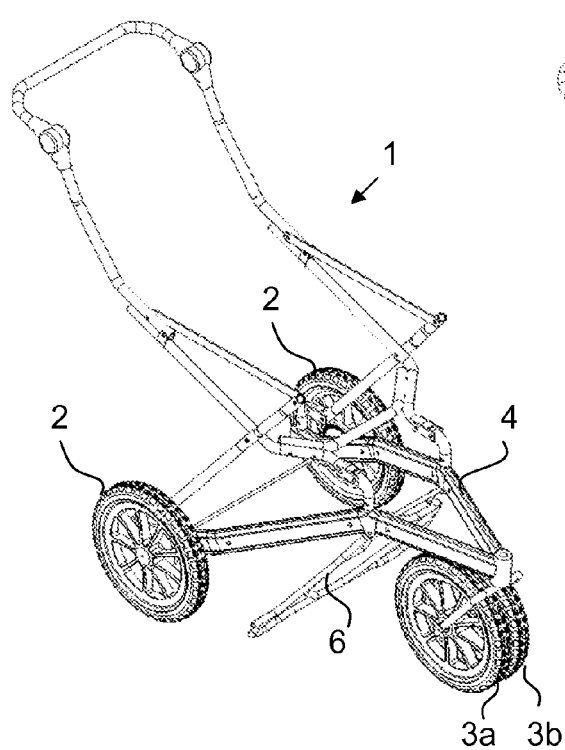
FIG. 9 shows a baby carriage having a stand according to an additional alternative embodiment of the invention where the stand is in a partly lowered position.

FIG. 9 shows an alternative embodiment of the baby carriage according to the invention, the baby carriage 1 having two rear wheels 2, a chassis 4 and a first front wheel 3a and a second front wheel 3b. The baby carriage 1 has also a stand 6, as has been described above, reference being made to, for instance, FIGS. 3a-3c. In FIG. 9, the stand 6 is shown in the partly lowered position thereof.

Figure 10A:
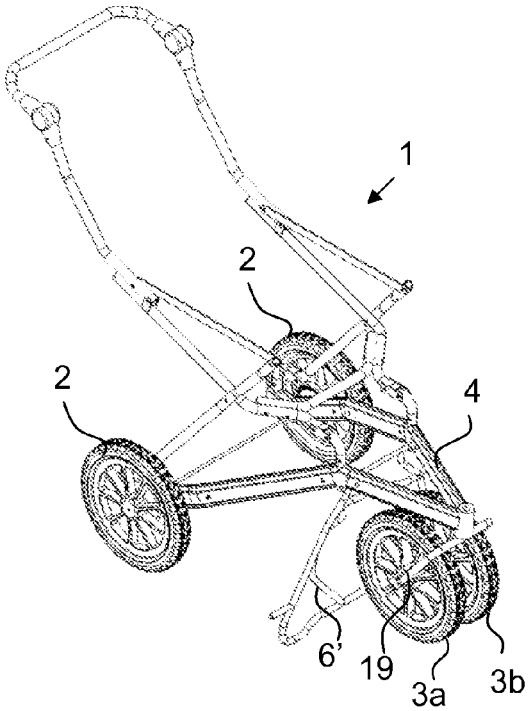
FIG. 10a shows a baby carriage having a stand according to an additional alternative embodiment of the invention where the stand is in a partly lowered position.

FIG. 10a shows an additional alternative embodiment of the baby carriage according to the invention, the baby carriage 1 having two rear wheels 2, a chassis 4 and a first front wheel 3a and a second front wheel 3b that are placed at a mutual spacing. The front wheels 3a, 3b in FIG. 10a have a connecting part 19 to the wheel hub placed on the outer sides of the front wheels, however it is is possible that the front wheels have a common connecting part in the form of a centre rod placed vertically between the two front wheels that is connected to the wheel hubs of the respective front wheels 3a and 3b. The baby carriage has furthermore a folding stand 6' that is connected to the chassis 4 and in FIG. 10a shown in the partly lowered position thereof.

Figure 10B:
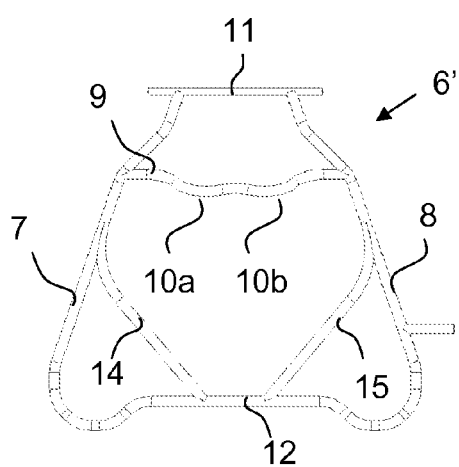
FIG. 10b shows a planar view of the stand in FIG. 10a as seen in the direction of travel of the baby carriage.
Figure 10C:
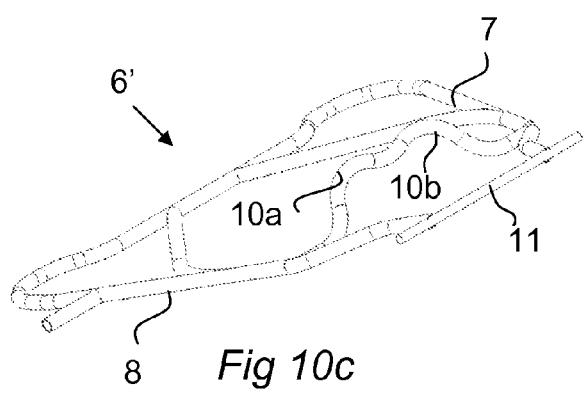

FIG. 10b shows a planar view and FIG. 10c a perspective view of a stand 6' for a baby carriage according to the embodiment shown in FIG. 10a. The stand 6' has a first elongate leg 7 and a second elongate leg 8. Said first elongate leg 7 is intended to be arranged on the outside of the second front wheel 3b and said second elongate leg 8 is intended to be arranged on the outside of the first front wheel 3a when the stand 6' is in the lowered supporting position. The stand 6' has furthermore a first horizontal cross-bar 9 that has an extension between the elongate legs 7, 8 and that is connected in one end thereof to said first elongate leg 7 and in the other end thereof to said second elongate leg. The cross-bar 9 serves the purpose of, on one hand, stabilizing the construction of the stand 6', and on the other hand acting as a stop against the front wheels 3a, 3b when the stand 6' is being lowered. The cross-bar 9 has a first curved section 10a and a second curved section 10b, which curved sections 10a, 10b are essentially U-shaped and intended to steer the front wheels in such a way that they are turned straight forward when the stand 6' is in the lowered supporting position.

Furthermore, the stand 6' comprises a horizontal rotating rod 11 having a rotation axis. The rotation axis is in the respective ends thereof intended for attachment of the stand 6' to the chassis 4. It is also feasible that the rotating rod is replaced by trunnions in the same way as has been described for the stand shown in FIG. 4b, which trunnions are intended for attachment in the chassis 4. The stand 6' may also have a second horizontal cross-bar 12 arranged under said first horizontal cross-bar 9 and connected to said first and second elongate legs 7, 8 in the same way as has been described for the stand according to FIGS. 3a-3c. The stand 6' may also optionally have a first and a second stabilizing leg 14, 15 in the same way as has been described for the stand in FIGS. 3a-3c.

Figure 11A:
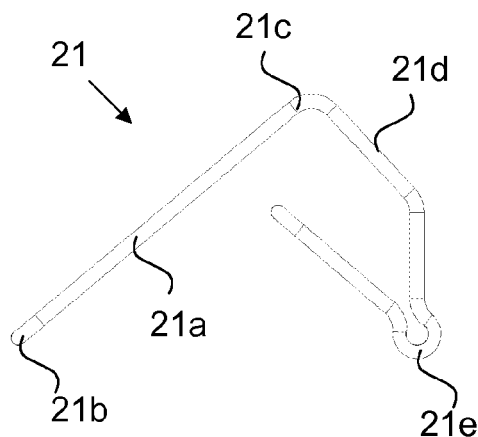
FIG. 11a shows a side view of an actuator for the stand according to the invention.

Baby carriages often have a brake to prevent the rear wheels from moving when the carriage should stand still, said brake usually being a foot brake that is brought to the position wherein it locks the rear wheels by the driver of the baby carriage pressing with a foot on a brake shaft of the brake. According to one embodiment of the invention, the stand may be detached from the raised position thereof by means of an actuator that is connected to the foot brake and arranged to act on the stand to lower the same when the driver presses the foot brake. This may, for instance, be carried out by means of an actuator 21 as is shown in FIG. 11a and connected to the brake shaft 22 of the foot brake in the way shown in FIG. 11b. The actuator 21 comprises an elongate part 21a having a first end 21b and a second end 21c, the first end 21b thereof being intended to press against the stand 6 when the same is to be lowered from the raised position thereof. The second end 21c is connected to a connecting part 21d that is to be connected to the brake shaft 22. The connecting part 21d comprises an essentially U-shaped part 21e which is intended to be clamped to the foot brake 22.

Figure 11B:
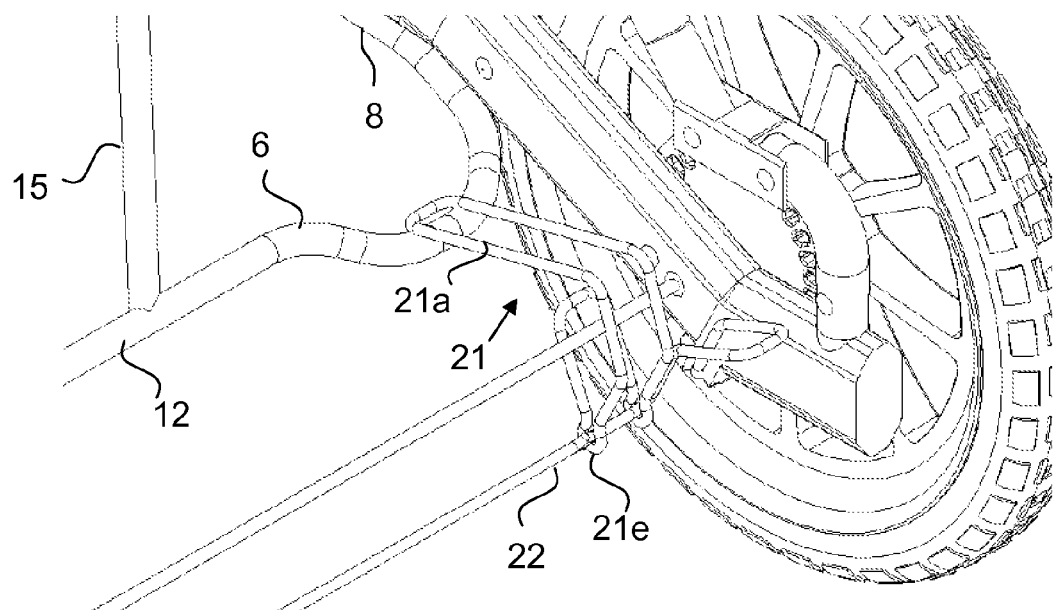

In FIG. 11b, a perspective view is shown of a part of the baby carriage when the stand 6 is in the raised position and on its way to be lowered and is in this position pressed downward by means of the actuator 21. The stand 6 has preferably the design shown in FIG. 3a. In order to allow the actuator shown in FIG. 11a to lower the stand 6 from the raised position thereof, the stand 6 has said second horizontal cross-bar 12 that is connected to said second elongate leg 8. The stand may also optionally comprise stabilizing legs 15 as is shown in FIG. 11b. When the driver presses/treads on the brake shaft 22 of the foot brake, the first end 21a of the actuator 21 will press the stand downward and in such a way release it from the raised position thereof. This embodiment is particularly advantageous when the stand is clamped in the raised position thereof by means of locking means, such as clamping means, as has been described above.

The stand according to the invention may suitably be formed of tubes to thereby weigh as little as possible. However, it may also be made from bars if desired. Suitably, at least the rotating rod 11 is made from solid bar. The stand may either be made from several different details that are joined together, for instance by welding. However, it is preferred that it is made from as few parts as possible and that the different parts instead are bent into their desired shape.

The invention is particularly suitable for three-wheeled baby carriages as there is a risk that three-wheeled baby carriages tip when they stand still, for instance when a passenger is getting up into or out of the baby carriage or when the passenger is not sitting entirely still. However, the invention is applicable also to such baby carriages that have several front wheels 3, for instance such that are shown in FIG. 9 and FIG. 10a.

The invention claimed is:

1. Baby carriage comprising two rear wheels and at least one front wheel, a chassis carried by said wheels, a device carried in the chassis and intended to hold a passenger, as well as a folding stand rotatably mounted between a raised position and a lowered supporting position on the chassis, wherein the stand has a first elongate leg and a second elongate leg, the extension thereof is on each side of the at least one front wheel when the stand is in the lowered supporting position, a first horizontal cross-bar that is connected in one end thereof to said first leg and in the other end thereof to said second leg, means for attachment of the stand in the chassis which means have a horizontal rotation axis located in one end of said first elongate leg and one end of said second elongate leg, respectively, and said first horizontal cross-bar being mounted between said legs a distance from said horizontal rotation axis, and wherein said first cross-bar on the folding stand abuts the at least one front wheel when the stand is in the lowered supporting position.

2. The baby carriage according to claim 1, wherein said first cross-bar has a curved section to receive said front wheel when the stand is in the lowered supporting position.

3. The baby carriage according to claim 1, wherein said first and second elongate legs have a part that is curved inward toward a vertical centre axis of the baby carriage in their respective ends to which attachment means are arranged.

4. The baby carriage according to claim 1, wherein said first and second elongate legs are longer than the diameter of the front wheel in such a way that the at least one front wheel not to have contact with the substratum on which the baby carriage rests when the stand is in the lowered supporting position.

5. The baby carriage according to claim 1, wherein the stand furthermore has a second horizontal cross-bar connected to said first and second elongate legs in their respective ends that are opposite to the ends to which the attachment means are arranged.

6. The baby carriage according to claim 5, wherein said second horizontal cross-bar is arranged between the at least one front wheel and the substratum on which the baby carriage rests when the stand is in the lowered supporting position.

7. The baby carriage according to claim 5, wherein the stand has a first elongate stabilizing leg, which in one end thereof is connected to said first elongate leg as well as in the other end thereof connected to said second horizontal cross-bar, as well as a second elongate stabilizing leg that in one end thereof is connected to said second elongate leg as well as in the other end thereof connected to said second horizontal cross-bar.

8. The baby carriage according to claim 1, wherein said means for attachment of the stand is a rotating rod.

9. The baby carriage according to claim 1, wherein said means for attachment of the stand is trunnions.

10. The baby carriage according to claim 1, wherein the stand is connected to the chassis by means of a spring attached to and acting on the stand upon raising and/or lowering of the stand.

11. The baby carriage according to claim 10, wherein the spring is connected to the stand in the first horizontal cross-bar thereof and to the inside of the chassis.

12. The baby carriage according to claim 10, wherein the spring is connected to the outside of the chassis and to the stand in a part projecting from the stand.

13. The baby carriage according to claim 1 further comprising an actuator attached to and acting on the stand from the raised position of the stand in order to bring the stand to the lowered position thereof.

14. The baby carriage according to claim 1, wherein the baby carriage comprises two front wheels, wherein the first horizontal cross-bar of the stand has two curved sections, and wherein each one of the curved sections receives one of said front wheels in the lowered position of the stand.

* * * * *